June 2, 1942. A. BOYNTON 2,284,634
PNEUMATIC PISTON PUMP, DIFFERENTIAL TYPE
Filed Jan. 31, 1939 2 Sheets-Sheet 1
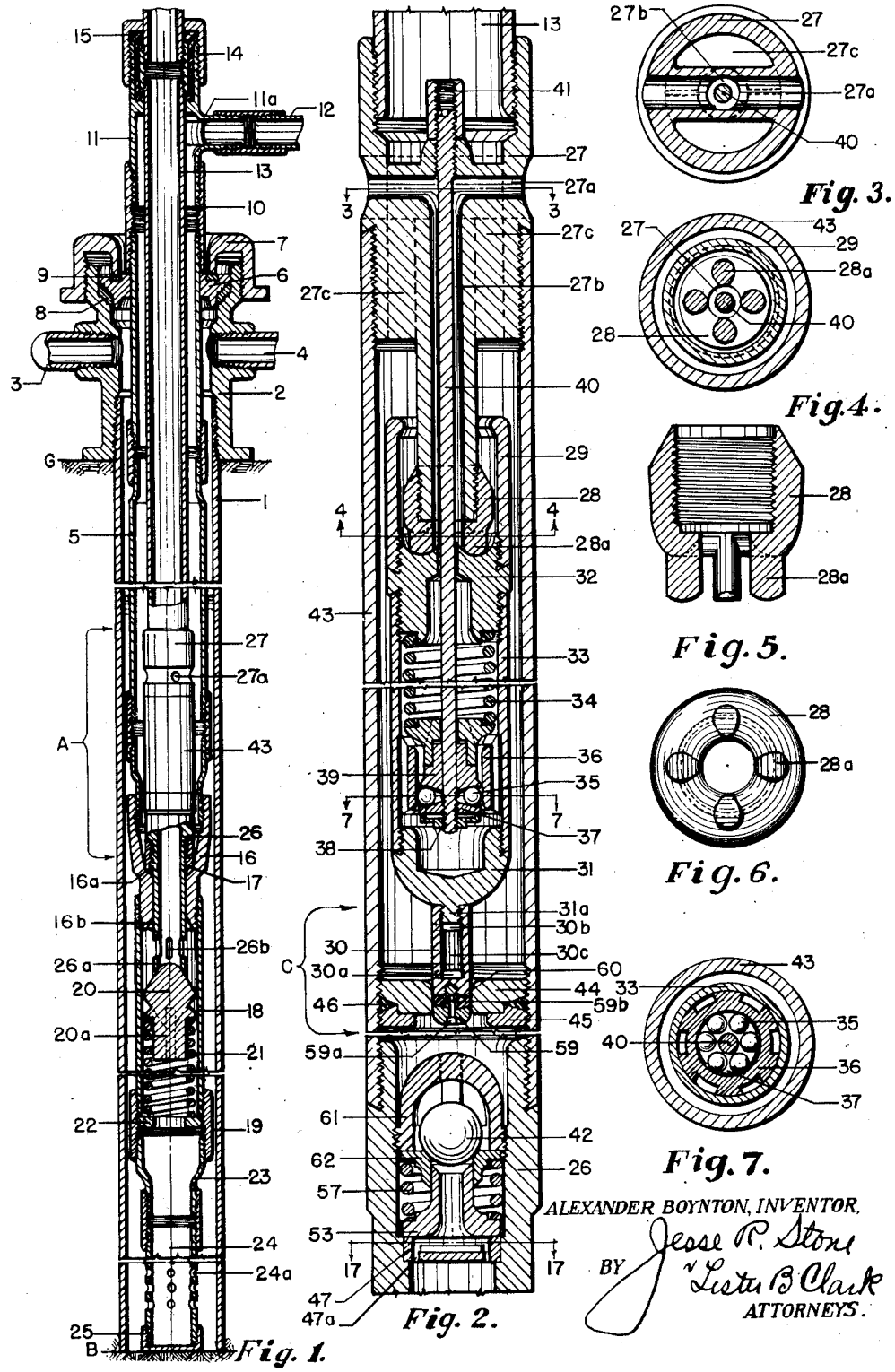
ALEXANDER BOYNTON, INVENTOR.
BY Jesse R. Stone
Lester B. Clark
ATTORNEYS.

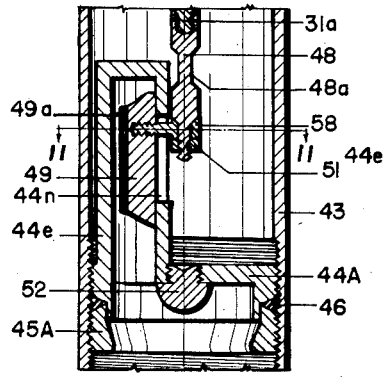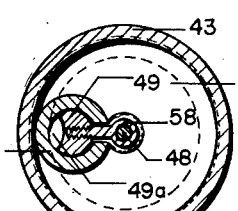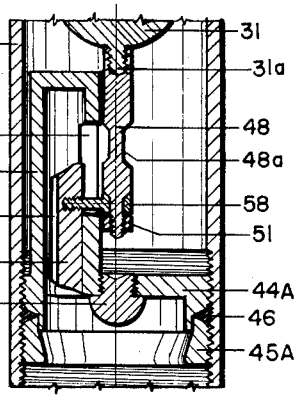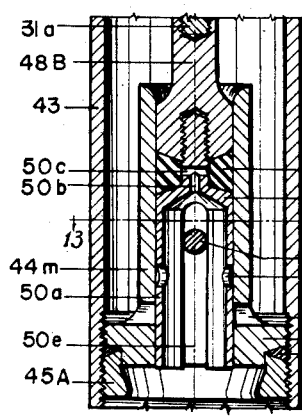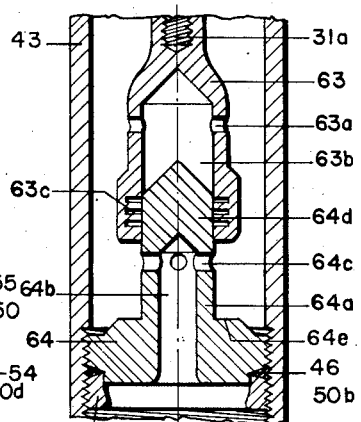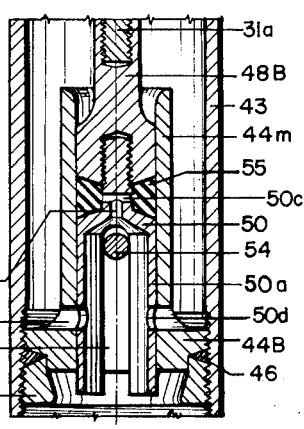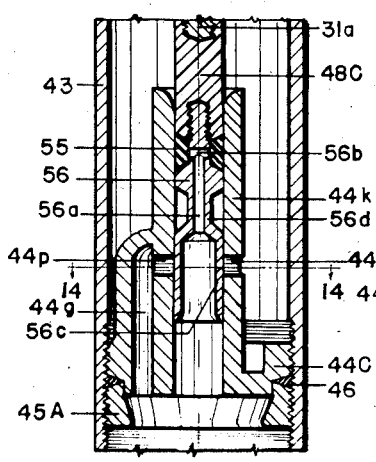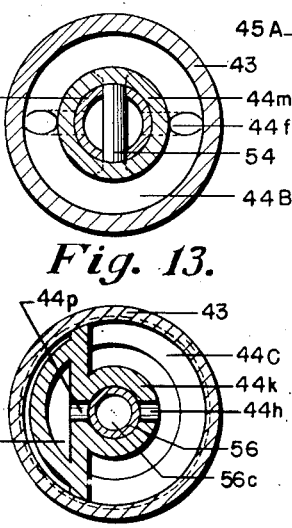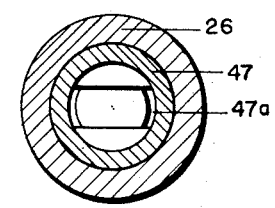

Patented June 2, 1942

2,284,634

UNITED STATES PATENT OFFICE 2,284,634

PNEUMATIC PISTON PUMP, DIFFERENTIAL TYPE

Alexander Boynton, San Antonio, Tex.

Application January 31, 1939, Serial No. 253,874

11 Claims. (Cl. 103—234)

My invention relates to a means for lifting liquids from wells and propelling liquids through pipe lines by force of compressed air or gas expanding under or behind a slug of liquid intermittently admitted into the eduction tube of a well or into a pipe line.

This invention is an improvement of that in my prior Patent 2,104,008 and distinguishes primarily therefrom as follows:

1. The gas valve seat member is provided with downwardly extending posts which prevent a seal-off between such seat member and the adjacent space support on the up stroke of the valves.

2. The latch sleeve is of such length that, on the down stroke of the valves, the latch balls do not roll under the curved lower end of the latch sleeve but stop up in the straight section thereof due to posts on the gas valve seat member striking upon the spacer support.

3. Four different constructions for the liquid intake valve are shown. In one of these the valve does not impinge upon well liquid on the down stroke of the valves.

The first two enumerated changes from the construction shown in my prior Patent 2,104,008 avoid the danger of the liquid load or slug stalling or tending to stall or stop moving due to the possible near equality between the per square inch weight of the load (actual square inch weight of the liquid in the eduction tube plus friction and inertia) and the pressure per square inch of the compressed air or gas used to lift the load or slug, because such near equality would under some conditions seat the air or gas valve except for posts thereon unless the valve spring should be too strong to allow proper relation between load and lifting power.

A constant inflow of gas at moments of near equality between the load and the lifting force is thereby provided regardless of latch adjustment or force required to compress the valve spring. Except for the posts the gas input would be cut off at moments of maximum resistance by the load until the expanding gas would spend itself to the degree that the resistance of the load would be lessened sufficiently to allow the force of the valve spring to again open the valve unless, as stated, the valve spring should be too strong for a proper relation between the load and lifting force.

In accordance with my prior invention and the present invention, a slug of liquid about to be expelled is admitted into the eduction tube of a well or into a pipe line by means of a valve that controls the admission of liquid thereto hereinafter referred to as the liquid intake valve. Such valve moves in unison with an air or gas intake valve hereinafter referred to as the air or gas intake valve. A spring constantly urges both valves toward the position in which the liquid intake valve is closed and the air or gas intake valve is open.

The clearance around the air or gas intake valve is of such limited area that the spring which works in conjunction with a latch will be compressed and the valve quickly closed when compressed air or gas is turned into the pressure tube to initiate the flowing operation. The liquid intake valve is then open and remains open until the weight of the liquid admitted into the eduction tube causes such near equality between the pressures acting above and below the exposed areas of the air or gas intake valve and connected parts that the spring again opens the air or gas intake valve and closes the liquid intake valve until enough air or gas has been admitted to expel the slug from the eduction tube.

Consequently the flowing cycle consists of simultaneously closing the air or gas intake valve and opening the liquid intake valve which remains open until the slug has entered the eduction tube, then simultaneously closing the liquid intake valve and opening the air or gas intake valve until the slug is expelled, whereupon the air or gas intake valve again closes while the liquid intake valve opens, and so on during the operating period.

An important object of this invention is to provide means whereby slugs of different weights or lengths may be expelled from wells by means of simply varying the pressure of the air or gas used to lift the slug. By increasing the air or gas pressure the length or weight of the slug is increased, or vice versa.

Another object of this invention is to provide economical means for lifting liquids from wells by the use of air or gas under pressure without allowing this pressure to contact the producing formations of the wells.

These and other objects are obtained by mechanisms illustrated in the accompanying drawings in which:

Fig. 1 is a vertical section of a well equipped with this device, using pressure tubing.

Fig. 2 is a vertical section of a portion of the device.

Fig. 3 is a horizontal section on the line 3—3, Fig. 2.

Fig. 4 is a horizontal section on the line 4—4, Fig. 2.

Fig. 5 is a vertical section of the combination air or gas valve seat and valve travel spacer member.

Fig. 6 is a bottom end view of Fig. 5.

Fig. 7 is a horizontal section on line 7—7, Fig. 2.

Fig. 8 is a vertical section of a liquid intake valve, which may be installed within the bracketed space C, Fig. 2, showing the valve closed.

Fig. 9 is a vertical section of a modified form of liquid intake valve shown in Fig. 8, showing the valve closed.

Fig. 10 is a vertical section of another modified form of liquid intake valve shown in Fig. 2.

Fig. 11 is a horizontal section on the line 11—11, Fig. 8.

Fig. 12 is a vertical section of a modified form of liquid intake valve, showing the preferred type thereof in the open position.

Fig. 13 is a horizontal section on the line 13—13, Fig. 9.

Fig. 14 is a horizontal section on the line 14—14, Fig. 10.

Fig. 15 is a vertical section of the liquid intake valve shown in Fig. 8, showing the valve open.

Fig. 16 is a vertical section of the liquid intake valve shown in Fig. 9, showing the valve open.

Fig. 17 is a horizontal section on the line 17—17, Fig. 2.

Corresponding characters are employed throughout to indicate and refer to corresponding parts.

Similar but somewhat different parts in figures illustrating modifications of the invention are designated by adding A, B, or C (capital letters) to the number used to designate the similar part in the preferred form. Different portions of the same part are referred to by adding $a$, $b$, or $c$ (small letters) to the number employed to designate the part as a whole.

Fig. 1 shows a well equipped with this device in which outer casing 1 is sealed above ground surface G by casing head 2 having two openings one of which is closed by bull plug 3; the other being connected with a pipe line 4 for the purpose of conveying away gas produced by the well. The pressure tube 5 is suspended centrally within outer casing 1 and, proximate its upper end, rests upon a plate 6 to which it may be welded or otherwise joined in leak proof contact therewith. Cap 7 is then screwed down upon lead ring 9, at the same time compressing lead ring 8, to form a seal against the escape of formation gas from the well. Any other casing head arrangement that will afford a seal between the well casing and the pressure tubing may be used; many such casing heads being well known to the art.

Pressure tube 5 extends above the casing head and is connected by means of a coupling 10 with a T 11 having a lateral branch 11a connected to the air or gas line 12. The upper end of said T is formed to support the eduction tube 13 which is closed about by packing gland 14 which clamps packing 15 producing a hermetical seal between pressure tube 5 and eduction tube 13. The pressure tube 5 may be of one diameter throughout its length or it may be swaged to a different diameter for part of its length as shown.

The pressure tube is connected at its lower end to a swaged coupling 16 which has a tapered seat 16a to be engaged by lead seal 17 poured on or otherwise secured upon member 26 which member constitutes the lower end of the device shown in Fig. 2. The lower end of the swaged coupling 16 is connected to a tubular housing 18 connected at its lower end to a coupling 19.

Within the housing 18 is a valve 20 resiliently urged upward by a spring 21 to engage normally within a seat 16b at the lower end of the swaged coupling 16. Said spring 21 rests upon an annular plate 22 in the coupling 19. Below the valve 20 the tubing may be extended downwardly as far as is desired, and I have shown the same as connected through swaged nipple 23 to a perforated pipe 24 having openings 24a therein and closed at its lower end by a cap 25, resting upon bottom of the well B.

The tubing may be extended to rest on bottom of the well as shown in Fig. 1, or it may be allowed to hang from the casing head with its lower end anywhere below annular plate 22.

While the pressure tubing is being lowered into the well, seal valve 20 contacts seat 16b upon which it is held by the force of seal valve spring 21 which spring is held in position within housing nipple 18 by plate 22 threadedly secured within coupling 19. When the flow tubing is lowered into position shown in Fig. 1, the slotted extension 26a forces the seal valve down to the position shown in Fig. 1 whereupon well liquid can enter the device via slots 26b. This liquid enters the pressure tubing extension through ports 24a of intake nipple 24, passes through seal valve spring 21, between fins 20a, and around valve 20.

The device shown in Fig. 2 being installed within the bracketed space A as shown in Fig. 1, compressed air or gas is supplied into the pressure tubing from pipe line 12 (if the well does not produce enough gas to flow it, as is illustrated in my prior Patents 2,042,583 and 2,104,008). The air or gas in the pressure tubing can enter the flow tubing only through ports 27a of the air or gas intake connection member 27 via passage 27b, around combination gas valve seat and spacer member 28, and through upper cord passages 27c, this path being open except when the air or gas intake valve is closed. Air or gas intake connection member 27 and lead seal carrier nipple 26 are joined together by case nipple 43 proximate the lower end of eduction tube.

The gas valve seat member 28 and air or gas valve 29 are interposed in the path of the air or gas flow from the pressure tubing into the eduction or flow tubing. The air or gas valve 29 and liquid intake valve 30 are joined together by means of connections 31 and 32 spaced apart by nipple 33 into which spring 34 is placed and into which latching sleeve 36 is pressed. Ball floor 37 is locked in place by ball floor lock nut 38. Latch balls 35 are held resiliently upon ball floor 37 by ball roof 39 in two parts pressed together as shown.

Latch shaft 40, with threaded upper end, adjustable by means of lock collar 41, supports the latch assembly except the sleeve 36 which moves with the nipple 33. Nipple 33 may be filled with a lubricant to facilitate easy working of the latch, breathing space for the latch assembly being provided in the slight clearance between latch shaft 40 and the central passage through member 32.

The latch sleeve is of such length that the latch balls will not engage upon the lower end thereof at any time. Except for the fact that this latch does not operate as a latch in the uppermost position of the valves, the latch and liquid intake valve shown in this invention are the same as illustrated and explained in my prior Patent 2,104,008.

Depending threaded extension 31a has threaded engagement with the valve 30 to the lower end of which valve retaining cap 59 is threadedly engaged to hold expansible ring 60 in position to be forced against the central passage in sleeve member 44 by fluid pressure entering through vertical port 59a and horizontal ports 59b as was explained in said prior patent.

The operation of check valve and liquid intake governor assembly is likewise the same as for the similar parts shown in my prior patents herein referred to and will, therefore, be discussed very briefly here. Yieldable seat member 62 supported by spring 57 holds check valve 42 within its cage 61 spaced above seat member 53 for the purpose of preventing air or gas pressure from escaping out of the device into the lower regions of the well where such pressure would hold back fluids that would otherwise enter the well, the spacing of valve 42 above its seat upon the upper end of member 53 being to allow the displaced liquid caused by the downstroke of valve 30 to move downward, thereby preventing valve 30 on its down stroke from becoming impinged upon liquid.

Liquid intake governor 47 pressed into or otherwise secured within member 26 as shown in Fig. 2 restricts the admission of well liquid through relatively small openings 47a in order to slow down the velocity of the liquid in passing through the device which might otherwise be damaged by abrasive substances in the well liquid.

When sufficient air or gas to open the device is placed in the pressure tubing, air or gas intake valve 29 will be forced to seat down upon member 28. This movement opens the liquid intake valve opposite the bracketed space C by thrusting lower port 30a below valve plate 44. Well liquid then enters the device through passage 30c via ports 30a and 30b of the liquid intake valve 30. When enough liquid has entered the flow tubing to unseat air or gas intake valve 29, with the aid of spring 34, the liquid intake valve will rise and close while air or gas will enter under the slug, through the annular clearance between the downward tubular extension of valve 29 and valve seat member 28, of liquid to expel it. Thereupon the air or gas valve again seats and again opens the liquid intake valve 30, thus completing the cycle which automatically repeats as long as compressed air or gas and well liquid find entrance to the device.

Valve plate lock nut 45 holds valve plate 44 securely in position and packing 46 prevents leakage along the threads of these members.

The latch in this device is intended to be operative only to provide snappy action in simultaneously opening the air or gas intake valve and closing the liquid intake valve. To that end the latch balls 35 engage upon the upper end of sleeve 36 when air or gas valve 29 is seated. The latch may be wholly omitted under some operating conditions.

The difference between the weight of the slug and the air or gas pressure used to expel it equals, and is determined by, the force required to compress spring 34 far enough to allow air or gas valve 29 to seat plus whatever force the latch employs in the lowermost position of the valves. The weight of the slug may, therefore, be increased by increasing the air or gas pressure, and vice versa. Increasing the air or gas pressure decreases the percentage of difference between the air or gas pressure and the weight of the slug, and vice versa, while the actual difference between them remains constant.

Fig. 12 illustrates the preferred type of liquid intake valve, all such valves being adapted to be installed within the bracketed space C. Sleeve valve 63 has a bore 63b slidable with slight clearance over the upstanding portion 64a of the male valve member 64.

When the valve is open, as shown in Fig. 12, well liquid entering through the bore 64b passes upward into the flow tubing through openings 64c. In this open position of the valve the lower end of sleeve valve 63 is well above the openings 64c in order not to cut or abraded by well liquid entering through these openings.

In the lower or closed position of the valve the lower end of valve 63 lands upon the seat 64e. The seal off of the valve in its closed position being produced by its close fit over the male member 64a and by the contact upon the seat 64e.

The grooves 63c may be packed with a lubricant such as a mixture of graphite and cup grease. These grooves also provide lodgement for abrasive particles such as sand which might, except for the grooves, cause greater damage to the valve.

It will be observed that the head 64d is of such length as to cover the grooves 63c when the valve is open in order to provide that the lubricant in the grooves will not be soon washed out. The openings 63a provide that well liquid which may leak into the chamber 63b above the head 64d when the valve is closed will escape into the flow tubing and not tend to open the valve.

The valve shown in Fig. 12, like the one shown in Figs. 8, 11, and 15, is not affected by pressure of the well liquid. The fact that the well liquid does not tend to urge this valve open or resist its closing is an important feature, especially during times when the device is deeply submerged.

Figs. 8, 11, and 15 show another modified type of liquid intake valve. In Fig. 8 the upper end of valve shaft sub 48 is threadedly connected to lower extension 31a of the upper portion of the valve assembly. The lower end of this sub has a reduced diameter fitted into an opening through valve stud 58 to which it is secured by lock nut 51. Valve stud 58 is threadedly fastened into the side of slide valve 49 which has a free working fit within valve sleeve extension 44e. Valve stud 58 has a free working fit within slot 44n which slot is of such length as to extend slightly above the stud on the up stroke as appears in Fig. 8 and to extend slightly below the stud on the down stroke as appears in Fig. 15. The milled out trough 49a in valve 49, Fig. 11, provides that well liquid may have free passage along the valve in order that it may have access in ample quantity to and through the upper portion of slot 44n when the valve opens as shown in Fig. 15. It will be noted that the portion of reduced diameter 48a of sub 48 permits free flow of well liquid through slot 44n when the valve is open as is clearly shown in Fig. 15.

The opening closed by plug 52 provides that a tool may be inserted to tighten or loosen nut 51. Valve sleeve member 44A threadedly connected into case nipple 43 is locked in place by valve sleeve lock ring 45A engaging upon packing 46 as is apparent. The valve 49 is kept engaged upon the surface of sleeve extension 44e on the side having slot 44n by force of the well liquid. This valve tends to keep itself ground leak proof by the sliding action instead of leaking from wear as is usually the case with worn valves.

Figs. 9, 13 and 16 show a further modified form of liquid intake valve. Sub 48B is threadedly connected to extension 31a above, and to hollow valve 50 below, this valve having a sliding fit within valve sleeve extension 44m of valve sleeve member 4B. Ports 50d in shell 50a are closed when the valve is in the uppermost position as shown in Fig. 9 and open in the lowermost position of the valve when these ports register with ports 44f as shown in Fig. 16. Pin 54 may be secured at each end by riveting or otherwise into extension 44m as appears in Fig. 13. Slots 50e which are displaced 90° from ports 50d fit slidably over the pin 54 to guide the valve ports 50d into registration with discharge ports 44f in the open position of the valve.

The inner surface of yieldable ring 55 contacts well pressure through ports 50b and 50c by which pressure the outer surface of this ring contacts the inner surface of the central passage through extension 44m and seals off against the vertical migration of well fluid past the valve.

Figs. 10 and 14 illustrate another modified form of liquid intake valve in which sub 48C is threadedly connected to extension 31a above and to slide valve 56 below. This valve has a sliding fit within the central drilled passage through extension 44k as appears. On the up stroke the valve shell 56c is positioned to close discharge port 44h by the force of well fluid contacting the shell through intake port 44p. On the down stroke the portion of reduced diameter 56d is positioned opposite ports 44p and 44h thereby permitting well fluid to pass from within cored opening 44g which communicates with the producing horizons of the well to the interior of case nipple 43 as above member 44C which chamber communicates with the eduction tube 13. It is apparent that expandible ring 55, receiving pressure through passages 56a and 56b, operates to produce a seal off in the same manner as was described in connection with Figs. 9, 13, and 16.

The device shown in this application may be installed in all the ways shown in both of my herein mentioned patents. It is to be understood that all reference to positions and directions such as "upper," "lower," "upward," "downward," etc. apply to the tool as illustrated in the drawings wherein the "upper" portion of the tool is shown uppermost.

The fact that the inventor has developed more than 35 different constructions that will accomplish the purposes herein stated, makes it apparent that other changes in mechanism and arrangement of parts can be made within the scope and purpose of this invention.

I claim:

1. In combination, a flow tube, a liquid inlet for passage of liquid axially of the flow tube including a valve member extending transversely of the tube, a projection on said member, a passage in said member, said passage terminating in outwardly opening ports in said projection, a second valve member surrounding said projection adapted to move longitudinally thereof to open and close said ports, an air inlet from the exterior to the interior of the tube above said liquid inlet, and means responsive to gaseous fluid pressure about the flow tube to move said second valve member longitudinally of the flow tube.

2. In combination, a flow tube, a valve plate transversely thereof, said plate including a valve sleeve extension longitudinally of the flow tube, a channel in said extension, a valve sleeve in said channel, a slot in the wall of the extension, and means connected to the valve sleeve through said slot so that the valve sleeve may be moved to uncover a portion of the slot and admit liquid therethrough.

3. In combination, a flow tube, a valve plate transversely thereof and including a valve sleeve extension, a channel longitudinally of said extension, a valve sleeve movable longitudinally within said channel, said sleeve having a longitudinal groove, a slot in the wall of said extension, and means attached to the valve sleeve through said slot to uncover a portion of the slot for the flow of liquid longitudinally of the flow tube through said groove and slot.

4. In combination, a flow tube, a valve plate transversely thereof, said plate including an axial projection having a central bore, a passage in the wall of said projection extending from the outer wall of the plate and terminating in a port within the bore, a radial opening in the projection substantially in the plane of said port, and a valve member movable in said bore to open said port and opening for passage of liquid longitudinally of the flow tube.

5. In combination, a flow tube, a valve plate transversely thereof, said plate including an axial projection having a central bore, a passage in the wall of said projection extending from the outer wall of the plate and terminating in a port within the bore, a radial opening in the projection substantially in the plane of said port, a valve member slidably fitting within said bore and having a reduced portion, and means for moving the valve member to bring the reduced portion into mating relation with said opening and port.

6. In combination, a flow tube, a valve plate transversely thereof, said plate including a projection extending longitudinally of the flow tube, a central bore longitudinally of the projection, a valve member in said bore, packing on said valve member sealably engaging the walls of the bore, a reduced portion on said valve member adjacent said packing, and opposed ports in said bore communicating with passages from opposite sides of the valve plate whereby a passage is formed longitudinally of the flow tube when the reduced portion of the valve member is brought into alinement with said ports.

7. In a device of the character described, an eduction tube for well liquid, a gaseous fluid inlet to said eduction tube including a tubular projection within said tube, a valve seat member on said projection, a housing longitudinally movable over said projection in response to pressure fluid passing therethrough and between the same and a portion of said housing, and a pressure fluid control valve formed within said housing, said valve being engageable upon said valve seat member, said projection having legs or posts adapted to engage said housing to prevent same from closing the passage through said tubular projection when said valve is open.

8. In a device of the character described, an eduction tube for well liquid, a gaseous fluid inlet to said eduction tube including a tubular projection with said tube, a valve seat member on said projection, a housing longitudinally movable over said projection in response to pressure fluid passing therethrough and between the same and a portion of said housing, a pressure fluid control valve formed within said housing, said valve being engageable upon said valve seat member, said projection having legs or posts adapted to engage said housing to prevent same from closing the passage through said tubular projection when said valve is open, a rod secured to said eduction tube, said rod extending through said tubular projection, and a spring-loaded latch on said rod, said latch having balls adapted to engage a sleeve within said housing for the purpose of releasably resisting the opening of said valve.

9. In a device of the character described, an eduction tube for well liquid, a gaseous fluid inlet to said eduction tube including a tubular projection within said tube, a valve seat member on said projection, a housing longitudinally movable over said projection in response to pressure fluid passing therethrough and between the same and a portion of said housing, a pressure fluid control valve formed within said housing, said valve being engageable upon said valve seat member, said projection having legs or posts adapted to engage said housing to prevent same from closing the passage through said tubular projection when said valve is open, a rod secured to said eduction tube, said rod extending through said tubular projection, a spring-loaded latch on said rod, said latch having balls adapted to engage a sleeve within said housing for the purpose of releasably resisting the opening of said valve, and a well liquid control valve movable by said housing for controlling the admission of well liquid into said eduction tube.

10. In a device of the character described, an eduction tube for well liquid, a gaseous fluid inlet to said eduction tube including a tubular projection within said tube, a valve seat member on said projection, a housing longitudinally movable over said projection in response to pressure fluid passing therethrough and between the same and a portion of said housing, a pressure fluid control valve formed within said housing, said valve being engageable upon said valve seat member, said projection having legs or posts adapted to engage said housing to prevent same from closing the passage through said tubular projection when said valve is open, a rod secured to said eduction tube, said rod extending through said tubular projection, a spring-loaded latch on said rod, said latch having balls adapted to engage a sleeve within said housing for the purpose of releasably resisting the opening of said valve, a well liquid control valve movable by said housing for controlling the admission of well liquid into said eduction tube by admitting such liquid to the eduction tube when said pressure fluid control valve is closed and excluding liquid from said tube when said valve is open.

11. In a device of the character described, an eduction tube for well liquid, a gaseous fluid inlet to said eduction tube including a tubular projection within said tube, a valve seat member on said projection, a housing longitudinally movable over said projection in response to pressure fluid passing therethrough and between the same and a portion of said housing, a pressure fluid control valve formed within said housing, said valve being engageable upon said valve seat member, said projection having legs or posts adapted to engage said housing to prevent same from closing the passage through said tubular projection when said valve is open, a rod secured to said eduction tube, said rod extending through said tubular projection, a spring-loaded latch on said rod, said latch having balls adapted to engage a sleeve within said housing for the purpose of releasably resisting the opening of said valve, a well liquid control valve movable by said housing for controlling the admission of well liquid into said eduction tube by admitting such liquid to the eduction tube when said pressure fluid control valve is closed and excluding liquid from said tube when said valve is open, and a check valve assembly for admitting well fluid into said eduction tube and preventing pressure fluid from escaping therefrom, said check valve assembly including means for restricting the rate of well fluid inflow to said eduction tube for the purpose of reducing the velocity of said fluid passing by said check valve and through said well liquid control valve.

ALEXANDER BOYNTON.